United States Patent
Teitenberg et al.

(10) Patent No.: US 6,421,769 B1
(45) Date of Patent: Jul. 16, 2002

(54) EFFICIENT MEMORY MANAGEMENT FOR CHANNEL DRIVERS IN NEXT GENERATION I/O SYSTEM

(75) Inventors: Tim Teitenberg; Bikram Singh Bakshi, both of Portland, OR (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 09/475,610

(22) Filed: Dec. 30, 1999

(51) Int. Cl.[7] .............................................. G06F 12/00
(52) U.S. Cl. ...................................... 711/170; 711/150
(58) Field of Search ........................... 711/6, 170, 150; 710/5, 10, 103, 48, 107, 263; 712/222; 713/500; 714/7

(56) References Cited

U.S. PATENT DOCUMENTS

| | | | | |
|---|---|---|---|---|
| 5,574,946 A | * | 11/1996 | Sala | 710/5 |
| 6,023,736 A | * | 2/2000 | Lambeth et al. | 710/10 |
| 6,070,182 A | * | 5/2000 | Rao et al. | 708/708 |
| 6,070,207 A | * | 5/2000 | Bell | 710/103 |
| 6,073,253 A | * | 6/2000 | Nordstrom et al. | 714/25 |
| 6,170,025 B1 | * | 1/2001 | Drottar et al. | 710/48 |
| 6,185,655 B1 | * | 2/2001 | Peping | 711/6 |
| 6,195,747 B1 | * | 2/2001 | Hou | 712/222 |
| 6,212,587 B1 | * | 4/2001 | Emerson et al. | 710/107 |
| 6,226,756 B1 | * | 5/2001 | Mueller | 713/500 |
| 6,243,787 B1 | * | 6/2001 | Kagan et al. | 710/263 |
| 6,243,829 B1 | * | 6/2001 | Chan | 714/7 |

* cited by examiner

Primary Examiner—David Hudspeth
Assistant Examiner—Fred F. Tzeng
(74) Attorney, Agent, or Firm—Fish & Richardson P.C.

(57) ABSTRACT

A memory management system includes a plurality of memory elements to enable translation of virtual memory addresses to physical memory locations. The memory elements have at least first and second memory element configurations. The first and second memory element configurations separately process allocated memory elements and unused memory elements, respectively.

27 Claims, 8 Drawing Sheets

EFFICIENT MEMORY MANAGEMENT FOR CHANNEL DRIVERS IN NEXT GENERATION I/O SYSTEM

BACKGROUND

The present invention relates to efficient memory management for channel drivers in Next Generation I/O systems.

Most server systems today use a shared-bus, memory-mapped method to link peripheral controller devices. By far the most widely used system bus is the Peripheral Component Interconnect (PCI) bus. The PCI bus was developed originally for use in PCs, but server manufacturers have broadly and successfully deployed PCI buses in server systems.

However, the widespread deployment of "I/O-centric" Internet applications for Web servers, e-commerce, Transmission Control Protocol/Internet Protocol (TCP/IP) networking, mail services, and on-line transaction processing is now creating demands on server Input/Output (I/O) subsystems that the PCI bus is not able to address. Those demands relate primarily to the reliability and scalability of the connection between server memory and I/O peripheral controller devices.

Next Generation I/O (NGIO) is an I/O architecture that was designed to meet the demands of the Internet and mission-critical e-commerce applications. NGIO is a new technology designed to address the reliability and scalability needs of mission-critical platforms of all kinds.

SUMMARY

An efficient memory management system for managing channel drivers is desired. The memory management system includes a plurality of memory elements to enable translation of virtual memory addresses to physical memory locations. The memory elements have at least first and second memory element configurations. The first and second memory element configurations separately process allocated memory elements and unused memory elements, respectively.

BRIEF DESCRIPTION OF THE DRAWINGS

Different aspects of the present invention will be described in reference to the accompanying drawings wherein.

DETAILED DESCRIPTION

Figure 1:
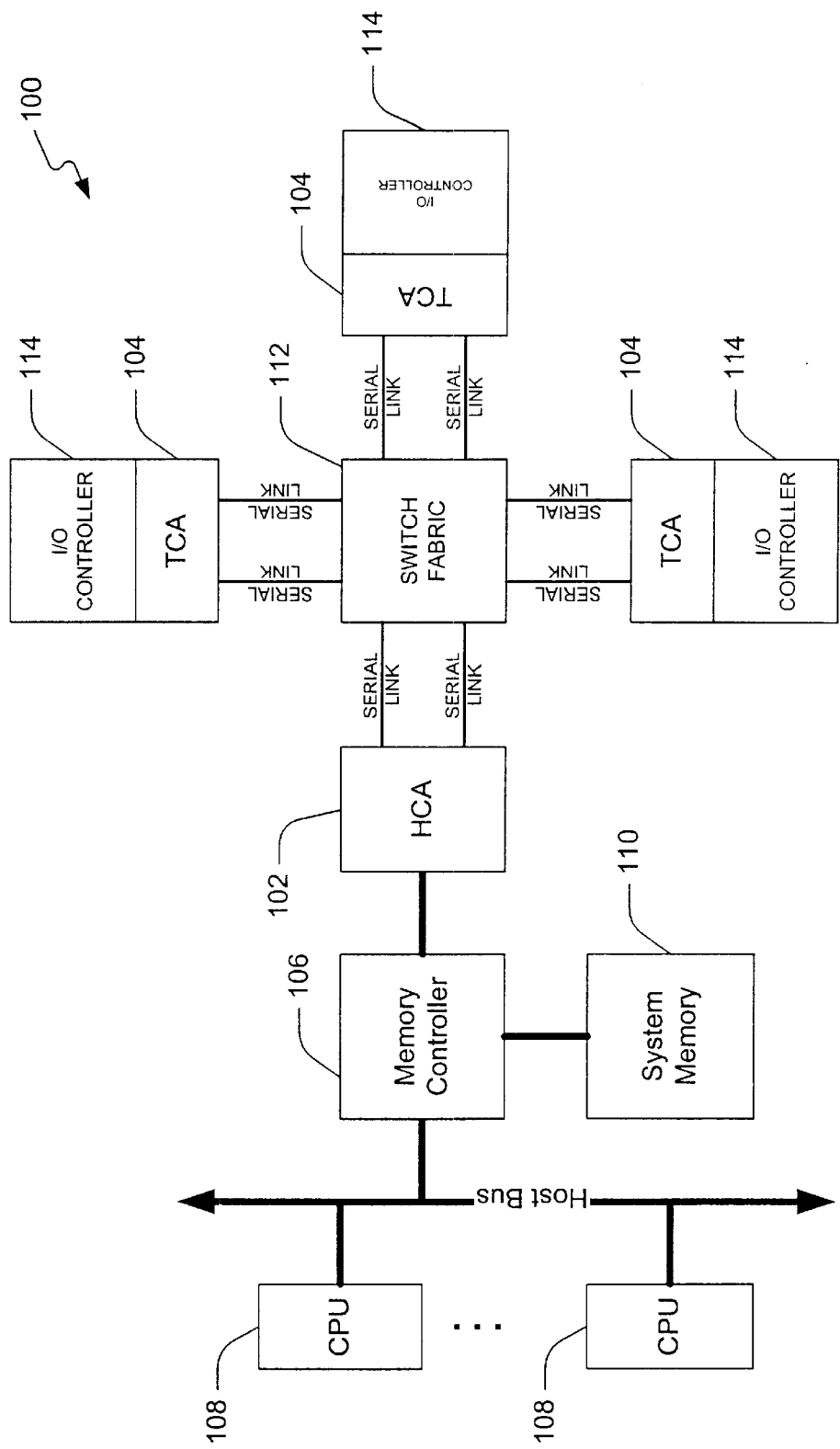
FIG. 1 is a block diagram of Next Generation I/O (NGIO) architecture.

A block diagram of the NGIO architecture 100 is shown in FIG. 1. NGIO primarily includes three essential elements. Channel interface, a switching fabric, and target channel-attached devices. The channel interface defines the data structures and command semantics that are used by any NGIO-conformant device, device driver, or application which uses NGIO to communicate with host memory. The channel interface includes a host channel adapter (HCA) 102 and a target channel adapter (TCA) 104. The HCA 102 is a bridge component that is linked directly into the host's memory controller 106. The HCA 102 has intimate knowledge of the host-processor 108 and memory 110 complex's internal protocols and cache status. High-level drivers called channel drivers provide HCA 102 with interface control to access the NGIO switch fabric 112. The TCA 104 connects fabric links to I/O controllers 114. The I/O controller 114 can be SCSI, Fibre Channel, or Gigabit Ethernet, which allows a variety of network and storage devices to be mixed within the I/O unit.

The switch fabric 112 comprises high-speed (2.5 Gbits/second, bi-directional) serial links, and devices that switch NGIO packets between ports in their journey from source to destination and back. NGIO uses a switched fan-out scheme instead of a parallel bus with parallel backplane slots. The link protocol for NGIO is specifically designed for maximum performance, predictability and reliability in carrying any form of communications from host memory 110 to destination I/O controller 114. No device can "hog the bus" and receive more than its fair share of resources with NGIO. All devices are fully isolated from one another, so a failure of one device cannot produce failures of another device or of an entire host system, as is often the case with shared-bus, memory-mapped I/O.

Each Next Generation I/O (NGIO) node has a global Translation and Protection Table (TPT) that enables a mapping between virtual memory reserved by the channel drivers and physical memory page locations on the NGIO system. This is similar to the Direct Memory Access (DMA) architecture in conventional I/O subsystems. Each entry in the TPT maps to one page of physical memory in the NGIO node. The translation part enables virtual to physical memory translation while the protection part allows only authorized access to the host memory.

All memory shared between a channel driver and the host channel adapter (HCA) must be registered with the HCA software stack. The memory registration process results in initialization of a set of pre-reserved TPT entries in the global TPT with valid physical memory page locations, security identifiers called Protection Tags (Ptags), and attributes that control memory access as well as translation and cacheable features. The HCA can cache translations between a TPT entry and its associated physical page address to reduce frequent access to the host memory resident TPT. The memory de-registration process sets the Ptag field of the TPT entry to zero and commands the HCA to flush all cached translations if the translation cacheable bit is set for the TPT entry.

The HCA software component called a memory manager implements certain processes to manage the TPT entries. Since most software applications that need to use I/O services require the service of a memory manager, the TPT management process often becomes the bottleneck in I/O operations. This often manifests in slower performance for I/O transactions.

Currently, a process called First-Fit is used to manage the allocation of TPT entries from the reserved TPT pool for memory registration and de-registration. In this process, each memory registration request consumes the first available subset of contiguous TPT entries in the TPT pool that is large enough to satisfy the memory registration request. A memory de-registration operation results in the memory manager returning the freed TPT entries to the TPT pool. If a memory registration call cannot be satisfied because of a lack of sufficient contiguous TPT entries, the channel driver has to either expand the size of the TPT pool or request until a de-registration call has made available enough contiguous TPT entries. This First-Fit process is biased towards TPT entries that are at the head of the TPT pool. The first large enough contiguous block of TPT entries are used for a memory registration request. Therefore, the head of the TPT pool becomes increasingly fragmented with a large number of small contiguous but disconnected TPT entry blocks. This will degrade performance of subsequent memory registration requests.

The present invention provides an enhanced memory management system for an efficient memory management of channel drivers in NGIO. The memory management system provides translation of virtual memory addresses to physical memory locations. The management system enables each channel driver to achieve optimal performance during the CPU intensive memory registration and de-registration operations. Each channel driver is required to reserve a pool of TPT entries from the global TPT by using Application Programming Interface (API) functions supplied by the HCA software. This operation is required before any virtual or physical memory allocated by the channel driver can be registered with the HCA software stack. Once the TPT pool is reserved, all requests to register and de-register memory are serviced using the TPT entries in the channel driver's TPT pool only. The channel driver can request to grow or shrink the size of the TPT pool by adding TPT entries to or deleting TPT entries from the pool.

The memory management system uses a modified version of the First-fit process called a No-bias First-Fit process to manage the allocation of TPT entries. The memory management system obviates the above-described problems by splitting the TPT pool into two sub-pools. One pool contains the free and unused TPT entries that are available for memory registration requests. The other pool contains TPT entries that have been used by previous memory registration requests.

Figure 2:
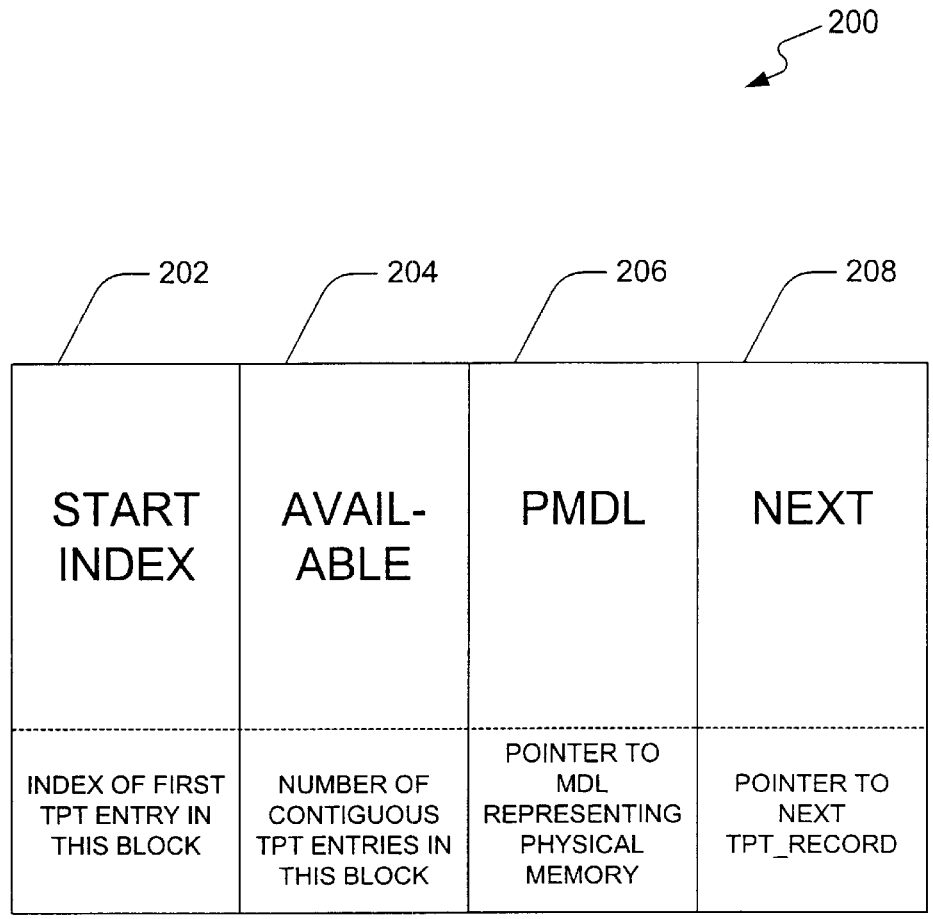
FIG. 2 shows an example of TPT entry elements.

An example of a TPT entry 200 is illustrated in FIG. 2. The TPT entry 200 has four elements. The first element 202 contains an index of first TPT entry in the block. The second element 204 indicates a number of contiguous TPT entries in the block. The third element 206 is a pointer to a Memory Descriptor List (MDL) representing physical memory. The fourth element 208 is a pointer to the next TPT entry.

Figure 3A:
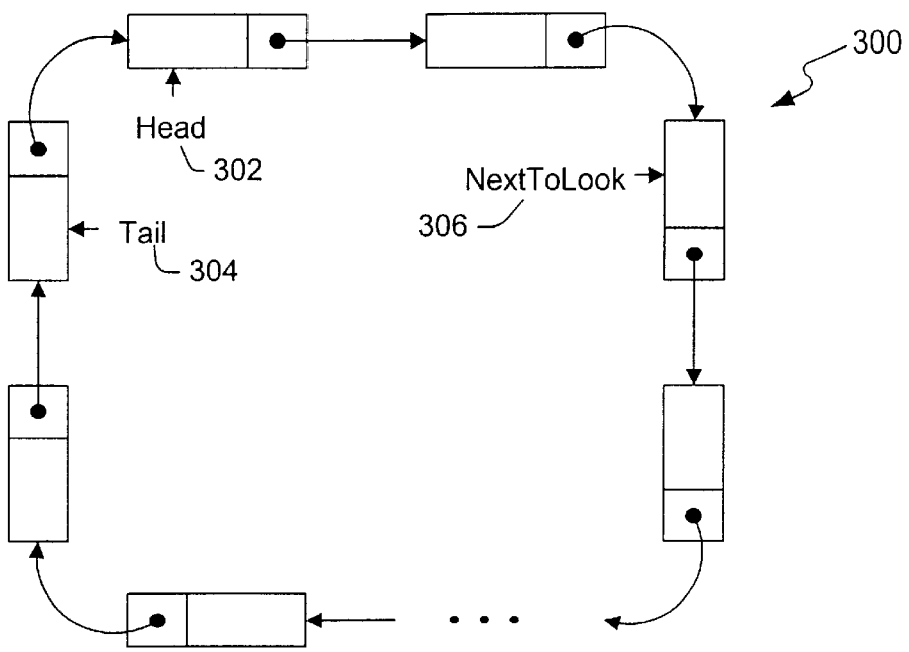
FIG. 3A shows an example of a circularly linked-list in a memory controller.

In one embodiment, the pool of unused TPT entries is maintained as a block of individually contiguous TPT entries chained together in a circularly linked-list. An example of a circularly linked-list 300 in the memory controller is shown in FIG. 3A. The linked-list 300 includes a head pointer 302 and a tail pointer 304. The head pointer 302 indicates the first TPT entry in the list. The tail pointer 304 indicates the last TPT entry in the list. A memory manager in the memory management system keeps a pointer called the NextToLook pointer 306 to eliminate the bias from the regular First-Fit process. The NextToLook pointer 306 is used as a starting point for all searches to find the first available block of TPT entries that can satisfy a memory registration request. On each successful search, the NextToLook pointer 306 is incremented to point to the next contiguous block of TPT entries. The next call to register memory will then start its search from the new position in the circularly linked-list as pointed to by the NextToLook pointer 306.

Figure 3B:
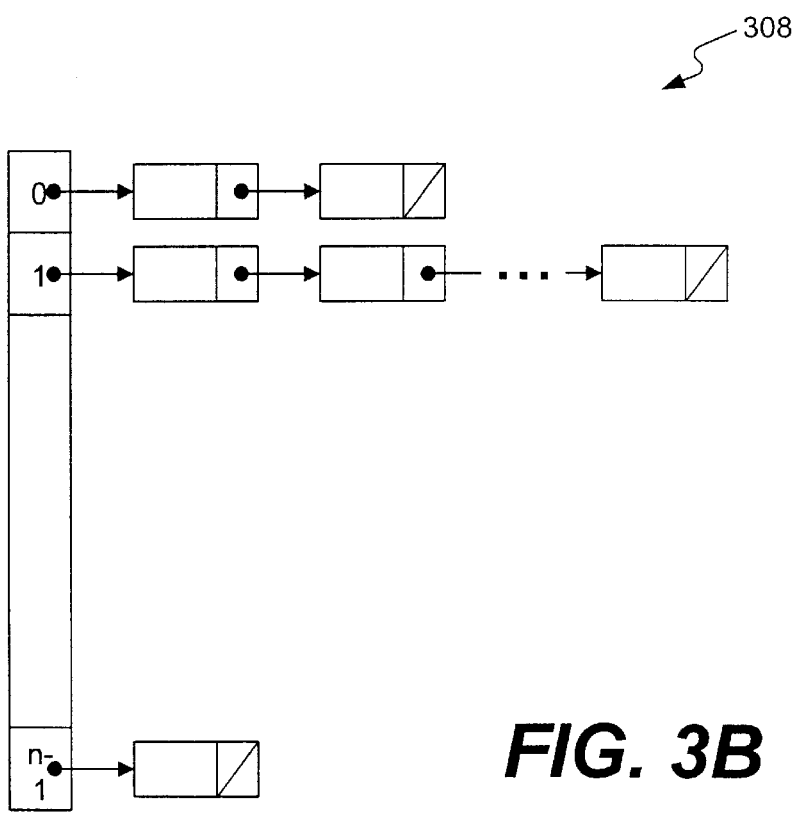
FIG. 3B shows one embodiment of a hashed table.

The pool of used TPT entries is implemented as a hashed or an allocation table. One embodiment of the hashed table 308 is shown in FIG. 3B. On a successful memory de-registration operation, the freed TPT entries are added to the unused TPT entry circular list. In a preferred embodiment, the size of the hashed table or a number of hash buckets (n) is chosen to be a prime number greater than or equal to 7. This choice allows a more uniform distribution of elements in the hashed table.

Figure 4:
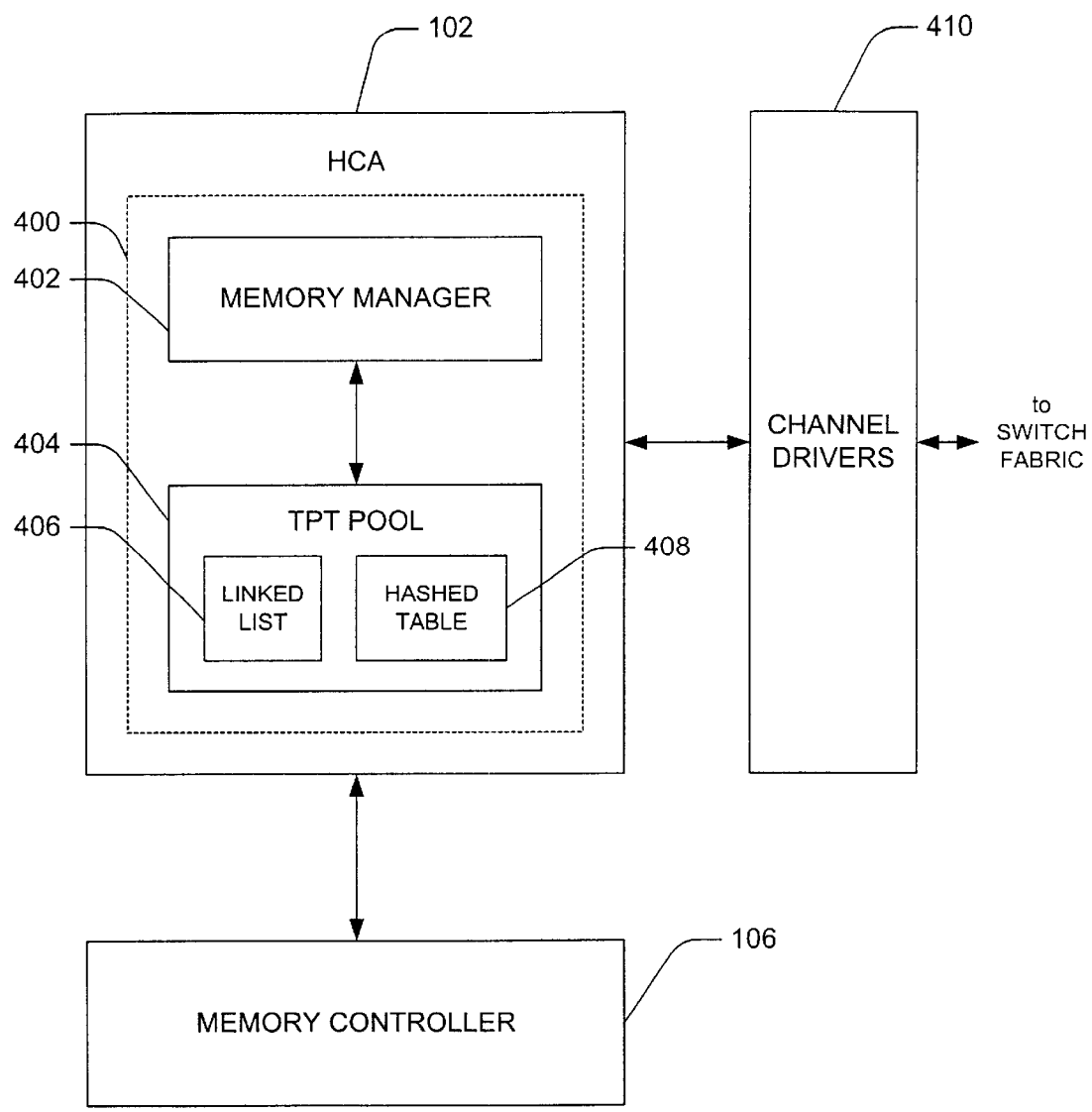
FIG. 4 is a block diagram of a memory management system according to an embodiment of the present invention.

FIG. 4 is a block diagram of a memory management system 400 according to an embodiment of the present invention. The system 400 is contained within an HCA 102. The memory management system 400 includes a memory manager 402 and a TPT pool 404. The memory manager 402 interfaces with the TPT pool 404 having a circularly linked-list 406 and a hashed table 408. The HCA 102 interfaces with channel drivers 410 and a host memory controller 106.

Figure 5:
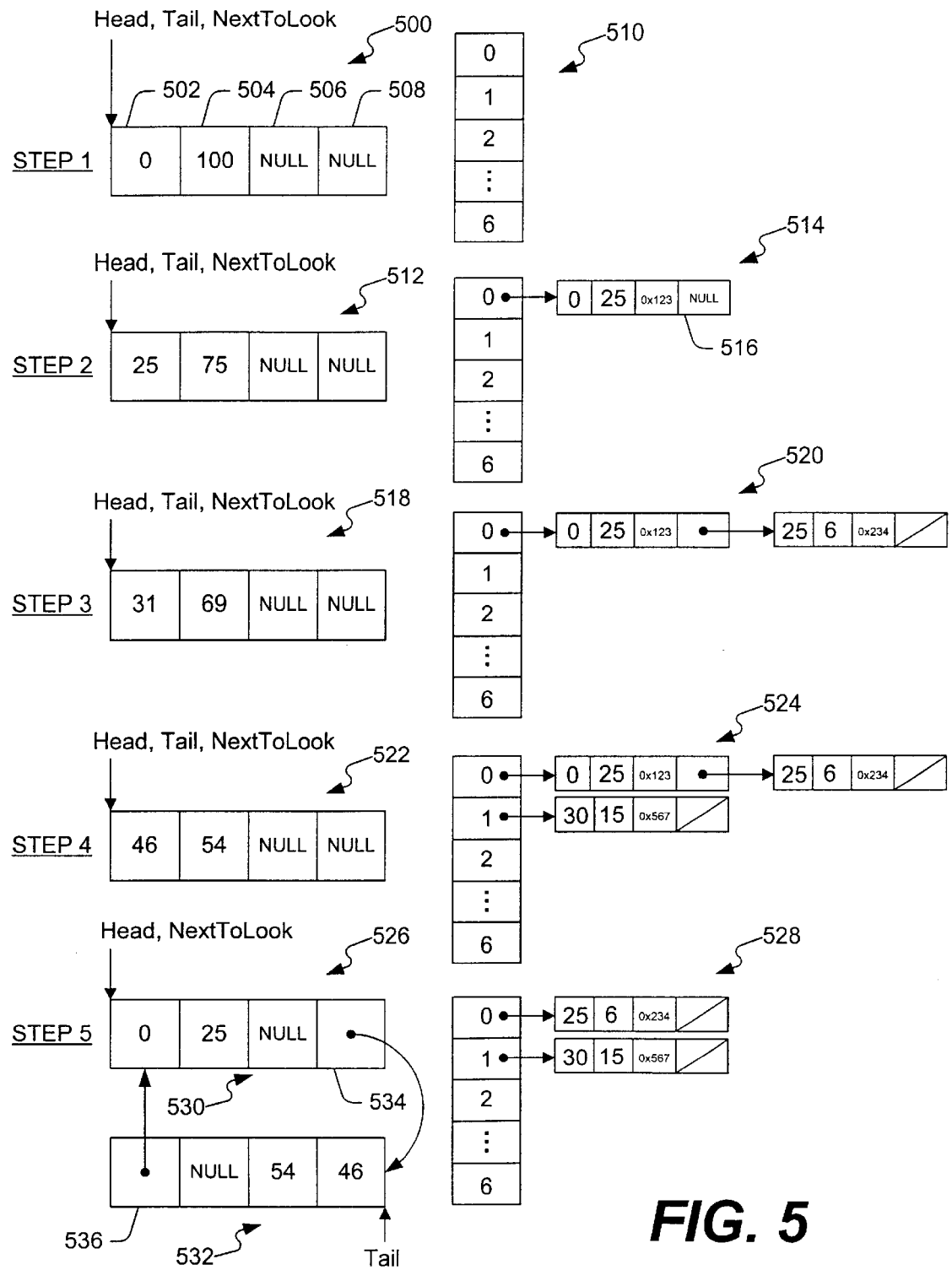
FIG. 5 illustrates one embodiment of a TPT pool management process.

FIG. 5 illustrates one embodiment of a TPT pool management process. In this embodiment, a TPT pool of size 100 reserved by a channel driver starts out with 100 contiguous TPT entries as shown in step 1. A circularly linked-list 500 containing a pool of unused TPT entries includes only one TPT entry. The head, the tail, and the NextToLook pointers point to this TPT entry. The first element 502 in the TPT entry (start index) is set to zero. The second element 504, which is the number of contiguous TPT entries, is set to 100. The third and fourth elements 506, 508 are set to NULL pointers. The hashed table 510 representing the pool of used TPT entries is empty.

In step 2, the memory manager 402 processes a memory registration request for 25 TPT entries. The elements in the linked-list 512 are modified to indicate a start index of 25 and the number of contiguous TPT entries to 75. The hashed table now contains a TPT entry with a start index of zero and a number of TPT entries of 25. A pointer 516 to the physical memory location includes an appropriate address.

Steps 3 and 4 process memory registration requests for 6 and 15 TPT entries, respectively. The elements in the linked-lists 518, 522 and the hashed tables 520, 524 are updated accordingly. For example, in step 3, the linked-list entry 518 contains an updated start index of 31 and remaining number of entries at 69 after registration of 6 TPT entries. In step 4, the start index is updated to 46 and remaining number of entries to 54 after registration of 15 more TPT entries. Therefore, as more memory registration requests come in, the size of contiguous block decreases.

The de-registration call in step 5 expands the pool but S the entries are no longer continuous. For example, the de-registration request frees the space occupied by the 25 TPT entries 514 that were registered in step 2. The hashed table 528 deletes the pointer to the TPT entry starting at entry number zero and containing 25 entries.

The circularly linked-list 526 now has two TPT entries. First entry 530 pointed to by the head pointer and the NextToLook pointer, and second entry 532 pointed to by the tail pointer. The first entry 530 has a pointer-to-next record 534 pointing to the second entry 532. The second entry 532 has a pointer-to-next record 536 pointing to the first entry 530. The first entry 530 has a starting index of 0 and a number of entries of 25. The second entry 532 starts at 46 and extends for 54 entries.

Figure 6:
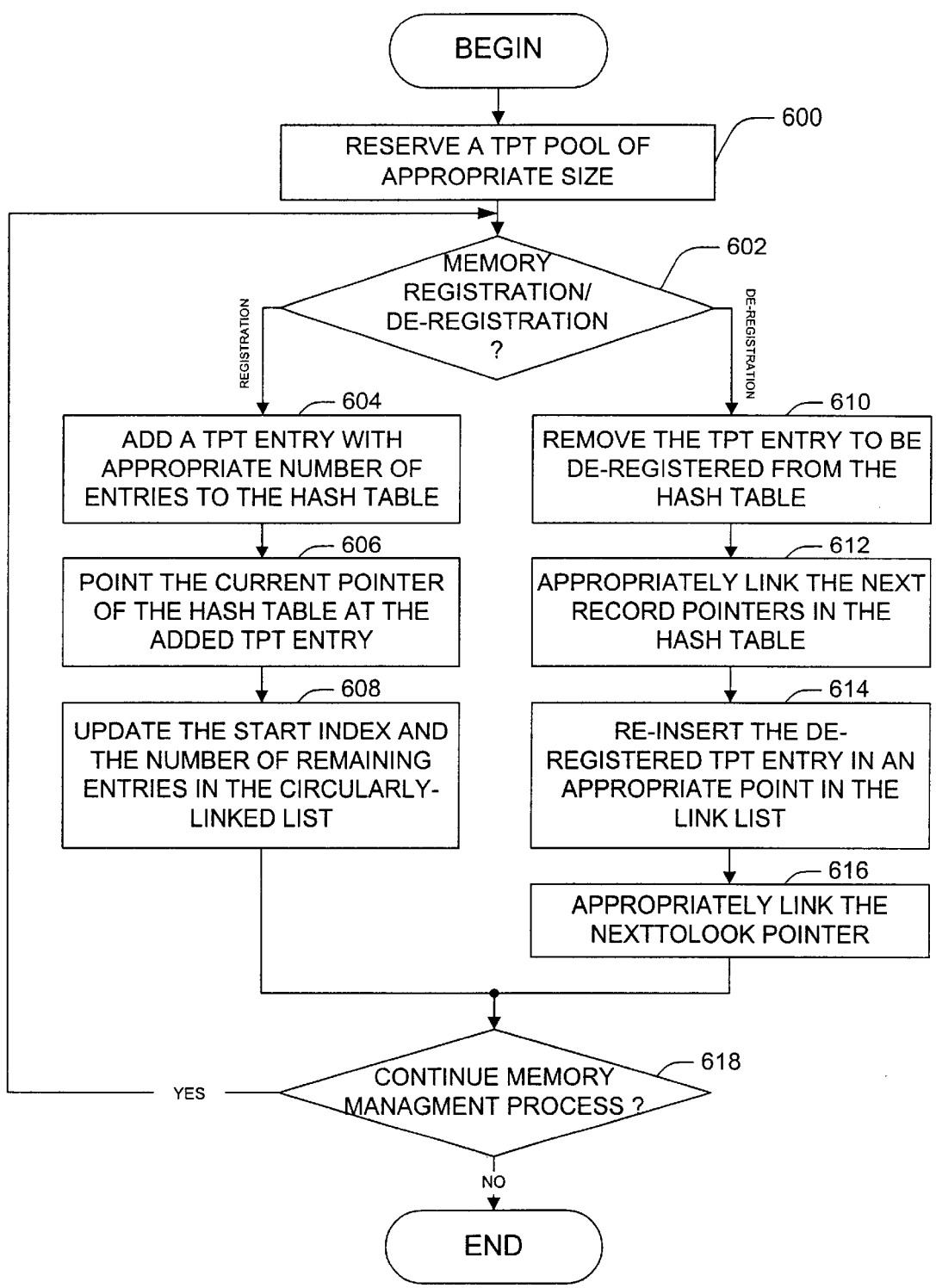
FIG. 6 is a flowchart of a memory management process according to an embodiment of the present invention.

An embodiment of the above-described memory management process is further illustrated as a flowchart in FIG. 6. The memory manager 402 reserves a TPT pool of appropriate size having two sub-pools, at step 600. The memory manager 402 then determines whether the registration or the de-registration process is to be performed (step 602). If the registration process is requested, the memory manager 402 adds a TPT entry with appropriate number of TPT entries to the hashed table, at step 604. The current pointer of the hashed table is updated to point to the added TPT entry (step 606). The start index and the number of remaining entries in the circularly linked-list is updated at step 608.

If the requested operation is a de-registration process, the memory manager 402 removes the TPT entry to be de-registered from the hashed table (step 610). The next record pointers in the hashed table are appropriately linked at step 612. The memory manager re-inserts the de-registered TPT entry at the appropriate point in the linked-list, at step 614. At step 616, the memory manager 402 appropriately links the NextToLook pointer. If continuation of the memory management process is requested (step 618), the memory manager 402 loops back to step 602 to perform the above-described process all over again.

Figure 7:
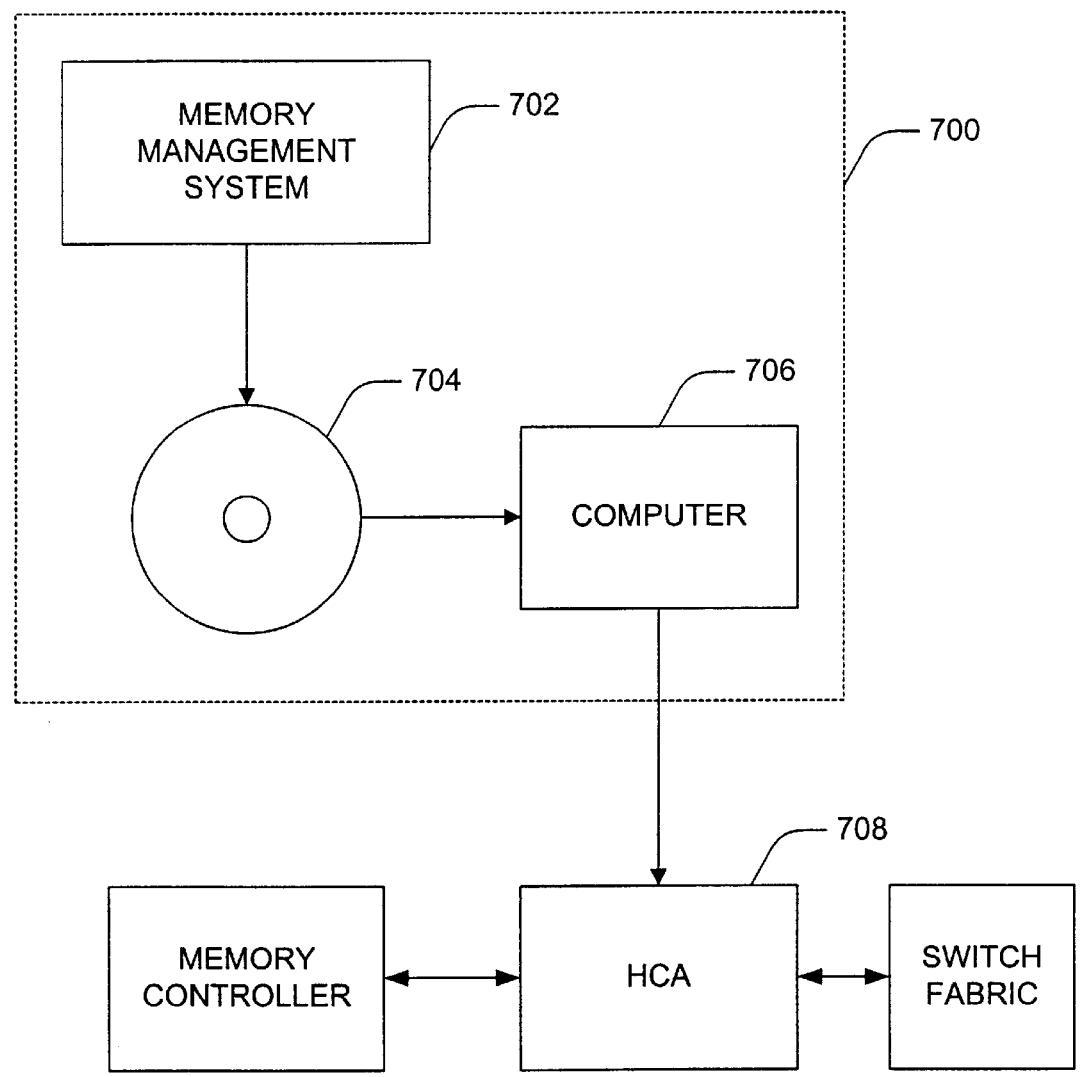
FIG. 7 shows an apparatus comprising a computer-readable storage medium having executable instructions for managing memory.

FIG. 7 shows an apparatus 700 comprising a computer-readable storage medium 704 having executable instructions 702 for managing memory. The apparatus 700 also includes a computer 706. The apparatus 706 processes the memory entries in the HCA 708.

Figure 8:
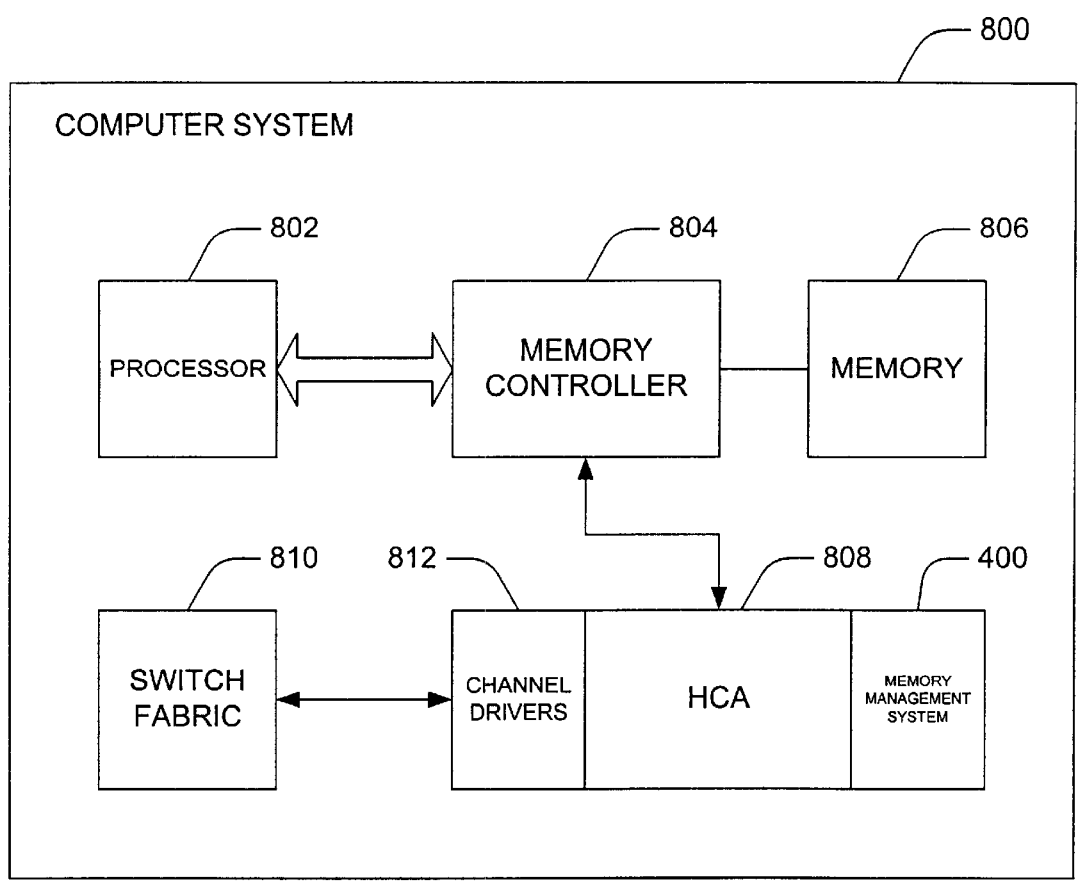
FIG. 8 is a block diagram of a computer system according to an embodiment of the present invention.

FIG. 8 is a block diagram of a computer system 800 according to an embodiment of the present invention. The computer system 800 has a processor 802, a memory controller 804, a system memory 806, a host channel adapter (HCA) 808, and a switch fabric 810. The HCA 808 includes channel drivers 812 that enable transfer of data between the system memory 806 and input/output devices connected to the computer system 800. The HCA 808 further includes a memory management system 400 that provides efficient management of channel drivers 812. In some embodiments, the computer system 800 is used as a network server or a hub.

Other embodiments and variations are possible. For example, the implementation of the No-bias First-Fit memory management process may be done using other data structures, such as stacks and/or non-circularly linked-lists.

All these embodiments are intended to be encompassed by the following claims.

What is claimed is:

1. A memory manager to manage virtual memory corresponding to a channel driver, comprising:
a plurality of memory elements to enable translation of virtual memory addresses associated with the channel driver to physical memory locations, said plurality of memory elements being grouped to include at least first and second memory element configurations, said at least first and second memory element configurations separately processing allocated memory elements and unused memory elements, respectively.

2. The memory manager of claim 1, wherein said first memory element configuration holds used or allocated memory elements in a hashed table configuration.

3. The memory manager of claim 1, wherein said second memory element configuration holds unused memory elements in a circularly linked-list configuration.

4. A memory management system comprising:
a pool of memory entries having at least first and second sub-pools being configured such that the first sub-pool includes unused memory entries and the second sub-pool includes allocated memory entries; and
a memory manager to reserve and process said pool of memory entries, said memory manager translating virtual memory allocated by said pool of memory entries to physical memory locations.

5. The system of claim 4, wherein an entry of said pool of memory entries includes at least three elements.

6. The system of claim 5, wherein a first element of said at least three elements is a start index indicating a first entry in the pool, a second element is a number of contiguous entries available, and a third element is a pointer to a next entry in the pool.

7. The system of claim 4, wherein said first sub-pool is a circularly linked-list.

8. The system of claim 7, wherein said circularly linked-list has a head pointer indicating a first entry in the list, a tail pointer indicating a last entry in the list, and a next pointer used as a starting point for searches to find first available block of entries.

9. The system of claim 4, wherein said first sub-pool forms the unused memory entries as a block of individually contiguous entries chained together in a link.

10. The system of claim 4, wherein said second sub-pool is a hashed table having a size chosen to be a prime number equal to or greater than seven.

11. A method for managing memory associated with a channel driver, comprising:
reserving a pool of memory entries having at least first and second sub-pools, the first sub-pool including allocated memory entries;
determining a request for registration or de-registration;
adding a memory entry to said first sub-pool of allocated memory entries, and appropriately updating said second sub-pool of unused memory entries, if the request is for registration; and
removing a de-registered memory entry from said first sub-pool, and appropriately re-inserting said requested memory entry into said second sub-pool, if the request is for de-registration.

12. The method of claim 11, wherein said first sub-pool is a hashed table having a pool of the allocated memory entries.

13. The method of claim 11, wherein said second sub-pool is a circularly linked-list having a pool of unused memory entries.

14. The method of claim 11, wherein said adding said memory entry includes updating a current pointer of the first sub-pool to point to said memory entry.

15. The method of claim 11, wherein said updating said second sub-pool includes updating a start address and a number of remaining entries in said second sub-pool.

16. The method of claim 11, wherein said removing said requested memory entry includes appropriately reconnecting memory entry links for said first sub-pool.

17. The method of claim 11, wherein said re-inserting said de-registered memory entry includes re-inserting the de-registered memory in an appropriate place in said second sub-pool.

18. The method of claim 17, wherein said re-inserting said de-registered memory entry further includes appropriately connecting next entry pointers.

19. An apparatus comprising a computer-readable storage medium having executable instructions for managing memory, associated with a channel driver, that enable the computer to:
reserve a pool of memory entries having at least first and second sub-pools;
determine a request for registration or de-registration;
add a memory entry to said first sub-pool of allocated memory entries, and appropriately update said second sub-pool of unused memory entries, if the request is for registration; and remove a de-registered memory entry from said first sub-pool, and appropriately re-insert said requested memory entry into said second sub-pool, if the request is for de-registration.

20. A computer system comprising:

a processor;

a memory controller coupled to said processor;

a system memory coupled to said memory controller;

a plurality of channel drivers to enable transfer of data between said system memory and input/output devices connected to the computer system; and a memory management system to manage memory associated with said plurality of channel drivers, the memory management system comprising;

a memory entry pool including a plurality of entries to translate virtual memory addresses to physical memory addresses, the memory entry pool including;

a first sub-pool comprising unallocated ones of the plurality of entries, a next pointer used as a starting point for searches to find a next available block of unallocated entries to be allocated; and a second sub-pool comprising allocated ones of the plurality of entries, the allocated entries not being available for the memory registration request.

21. The computer system of claim 20, wherein said computer system is used as a network server.

22. The memory management system of claim 20 wherein the memory entry pool comprises TPT records in a Translation and Protection Table.

23. The memory management system of claim 22 wherein the Translation and Protection Table is common to and is managed for the plurality of channel drivers.

24. The memory management system of claim 20 wherein the first sub-pool is configured as a circular linked list of records, each record representing a contiguous block of unallocated memory entries.

25. The memory management system of claim 20 wherein the first sub-pool includes a first pointer to point to a next one of the records, each record representing unallocated entries to be evaluated in response to receiving the memory registration request.

26. The memory management system of claim 20 wherein the second sub-pool is configured as a hashed table of records, each record representing a contiguous block of allocated memory entries.

27. The memory management system of claim 20 including a no-bias first-fit scheme to manage the first pool.

\* \* \* \* \*